May 15, 1934.   O. U. ZERK   1,959,258
BALL JOINT HOUSING
Filed May 4, 1932
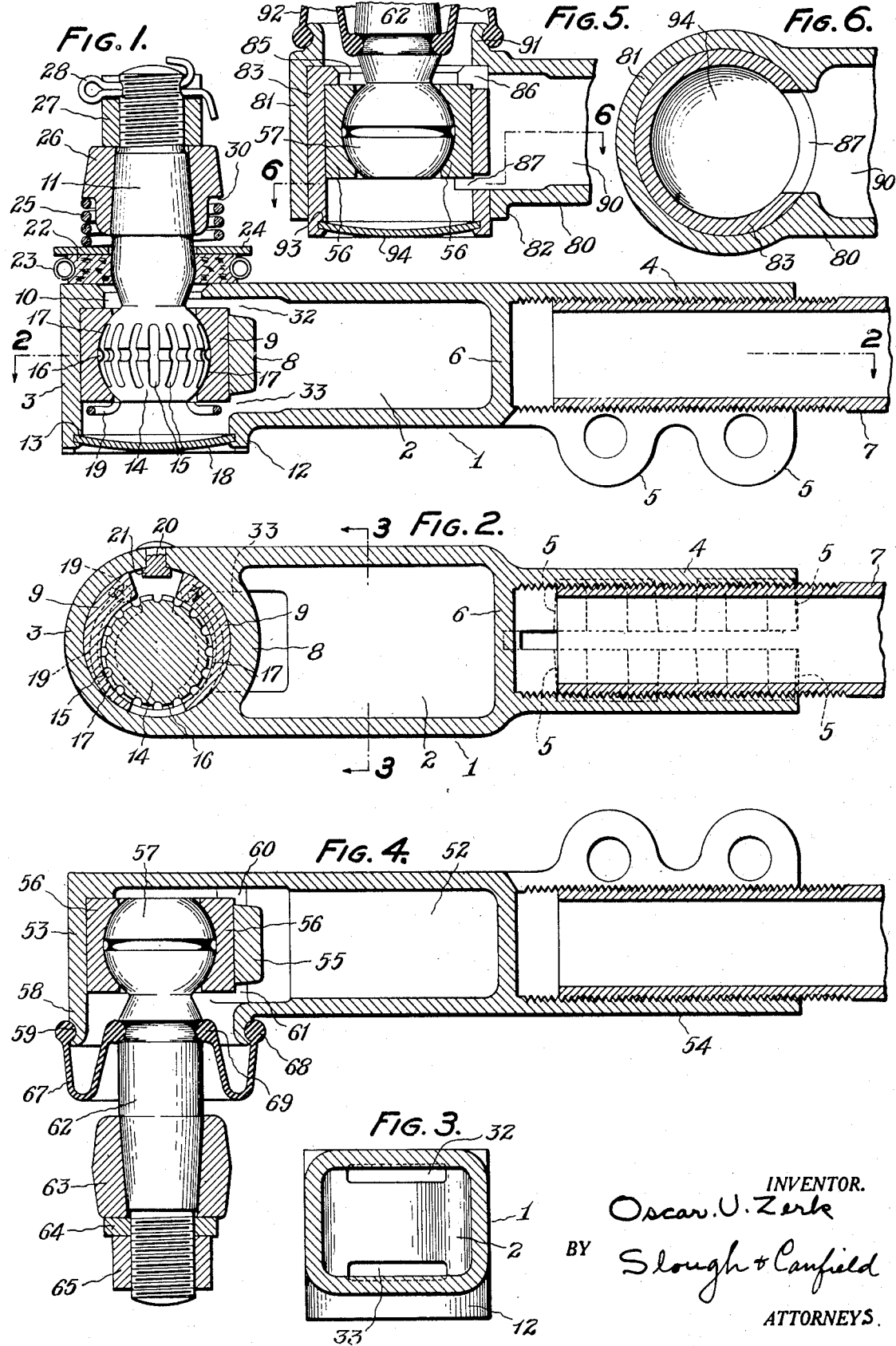
INVENTOR.
Oscar. U. Zerk
BY Slough & Canfield
ATTORNEYS.

Patented May 15, 1934

1,959,258

UNITED STATES PATENT OFFICE 1,959,258

BALL JOINT HOUSING

Oscar U. Zerk, Chicago, Ill.

Application May 4, 1932, Serial No. 609,175

5 Claims. (Cl. 287—90)

My invention relates to joint housings in general and particularly to ball joint housings generally tubular in form and having associated therewith clamping means adapted to engage the tie rods of an automobile or the like.

This invention relates broadly to joint housings of the type comprising a substantially hollow housing, preferably formed of malleable iron and having cast integral therewith a generally tubular portion adapted to be utilized as clamping means engaging the tie rod or drag link and the like of an automobile. The housing being of generally hollow construction will ensure the maximum of strength with the minimum of weight and provide relatively great resistance to bending or torsional stresses.

The ball joint elements may be disposed in an integral portion of the housing and a relatively inexpensive means of sealing the housing is provided which requires a minimum of machine operations, and which effectively seals the housing against the egress or escape of lubricant which may be contained in the housing whereby an initial supply of joint lubricant may suffice for the entire useful life of the joint.

It is therefore an object of my invention to provide a housing for ball joints or the like possessing exceptional rigidity and strength relative to the weight of the housing.

Another object of my invention is to provide an improved housing for ball joints and the like, possessing relatively great rigidity and strength and which will be relatively inexpensive to manufacture.

Another object of my invention is to provide an improved housing for ball joints and the like adapted to be effectively sealed against the escape therefrom of lubricant initially supplied thereto.

Another object of my invention is to provide an improved housing for ball joints and the like, adapted to be effectively and efficiently sealed after assembly of the ball joint therein.

Another object of my invention is to provide an improved housing for ball joints and the like, having clamping means integrally associated therewith.

Another object of my invention is to provide an improved housing for ball joints and the like, preferably formed of malleable iron and susceptible of being cast as a unit.

Another object of my invention is to provide an improved housing for ball joints and the like which requires a minimum of machining operations.

Another object of my invention is to provide an improved housing for ball joints and the like, wherein the housing comprises a generally hollow portion disposed laterally of the ball joint elements and of sufficient length to permit of a relatively great leverage thereabout.

These and other objects of the invention will become more apparent from a consideration of the following description and drawing wherein like parts are referred to by reference characters, and wherein, Fig. 1 is a longitudinal medial sectional view of a preferred embodiment of my invention with a ball joint disposed therein;

Fig. 2 is a horizontal sectional view taken along the lines 2—2 of Fig. 1;

Fig. 3 is a transverse sectional view taken along the lines 3—3 of Fig. 2;

Fig. 4 is a longitudinal medial sectional view of a modification of my invention;

Fig. 5 is a fragmentary sectional view of another modification of my invention; and, Fig. 6 is a horizontal sectional view taken along the lines 6—6 of Fig. 5.

Referring to Figs. 1, 2 and 3 of the drawing, a housing generally indicated at 1, comprises a chamber portion 2 generally rectangular in cross-section provided with a substantially semi-circular end wall 3 and an interiorly threaded clamping portion 4 longitudinally slotted intermediate integral spaced lugs 5. The lugs 5 disposed on either side of the longitudinally extending slot are provided with aligned apertures adapted to have a bolt inserted therein whereby the lugs may be clampingly drawn together by rotating a nut threadedly engaging the bolt ends, thereby effectively securing a tie rod or the like 7 to the housing.

A wall 6 partitions chamber 2 from clamping portion 4 and thus ensures that the chamber will be effectively sealed against the ingress of foreign substances which might otherwise enter through the clamping end of the housing, and against the escape of lubricant which may be supplied to the chamber.

A semi-circular band 8 is complementary to and cast integral with the end wall 3 of the housing, the inner walls thereof thus forming a circular surface adapted to act as a guideway for ball engaging shoes 9 in sliding engagement therewith.

The top face of the housing is apertured concentric with the end wall 3 as indicated at 10 to permit a shank 11 of a ball element to be projected therethrough. The aperture 10 is preferably flared outwardly as indicated in Fig. 1 to accommodate the universal action effected by shank 11 of the ball element. A portion of the bottom wall of chamber 2 is flared downwardly to form a generally circular collar 12 concentric with end wall 3 internally recessed to provide a shoulder 13.

A ball element is provided with a ball 14 preferably provided with a plurality of radial grooves 15 and a transverse groove 16 on the surface thereof whereby a lubricant may more effectively penetrate to the engaged bearing surfaces. The ball 14 of the ball element is embraced by similarly oppositely disposed shoes 9 having recessed inner faces concentric with the ball 14 and outer faces eccentric therewith and concentric with end wall 3 and band 8 which forms a guideway therefor. The shoes 9 are engaged by a C-form spring 19 having the ends thereof flared upwardly to engage recesses 17 provided therefor in the shoes 9. The shoulder 13 is sealed by an outwardly dished plate 18 which abuts shoulder 13 of the collar 12 and is held in sealing engagement thereagainst by flanging over spaced peripheral portions of the collar.

The spring 16 is under expansive tension so that the ends thereof disposed in apertures 17 of the shoes tend to separate from each other and thus tend to move the shoes 9 in opposite rotational directions whereby a slight wedging action is effected and wear occuring between the ball 15 and the shoes and between the shoes and the end wall 3 and 6 and 8 will be compensated. In order to prevent the shoes from drifting unduly, rotatively, a button 20 is riveted in an aperture provided therefor in the side wall of the housing, the headed portion 21 thereof limiting the rotative movement of the shoes.

The shank 11 of the ball element which projects through the aperture 10 in the housing is sealed therewith in the following manner. A sealing ring 22 formed of suitable packing material such as cork is radially pressed against the shank 11 by means of a circumferential spring 23.
Super-posed on sealing ring 22 is a washer 24 preferably sheet metal which encircles shank 11 and forms a seat for a preferably helical spring 25 which is normally compressed and therefore exerts a thrust axially of shank 11. An eye 26 of a connecting member is telescoped over shank 11 and secured thereto by a nut 27 threadedly engaging the shank end and non-rotatably secured thereto by a pin 28 disposed in aligned apertures provided in nut 27 and the end of shank 11. The eye 26 is preferably provided with a circular shoulder 30 providing an abutting surface for the upper end convolutions of spring 25.

The packing ring 22 is thus pressed radially toward the shank 11 and directly against the top surface of the housing 1 thereby providing an effective seal preventing ingress of abrasive material to the bearing surfaces and escape of lubricant from the housing.

Channels are provided intermediate the band 8 and the top and bottom inner walls of chamber 2 as indicated at 32 and 33 respectively whereby the core inserted to form the chamber 2 during the casting process may be removed. The channels 32 and 33 also provide a means of communication from chamber 2 to the joint elements when the chamber is used as a lubricant reservoir.

Fig. 4 illustrates a modification of my invention wherein the housing comprises a generally rectangular shaped chamber 52 having a generally semi-circular end wall 53 and an integrally formed clamping portion 54. A generally semi-circular band 55 is formed integral with and complementary to the end wall 53 of the housing to form a guideway for shoes 56 which engage a ball 57 of the ball element.

The bottom wall of the housing is flared outwardly to form a collar 58 concentric with the housing end wall 53 and externally grooved as indicated at 59. Channels 60 and 61 are formed intermediate the band 55 and the inner top and bottom walls respectively of the housing in a manner and for a purpose hereinbefore described.

The shank 62 of the ball element projected through the aperture formed by the collar 58 and has telescoped thereon an eye 63 of a pitman arm or the like which is secured in place by a lock washer 64 and nut 65, the nut 65 threadedly engaging the reduced end of shank 62.

At a spaced distance from the ball 57, shank 62 is circularly grooved to provide an engaging surface for a closure member 67 more fully described in my copending application, Serial No. 609,176, filed May 4, 1932 comprising resilient rings 68 and 69 constrictingly engaging the collar 58 and the grooved portion of the shank 62 respectively. The rings 68 and 69 are joined by a relatively thin flexible wall integral therewith and preferably formed of oil-proof synthetic rubber. As more fully disclosed in my aforementioned copending application, such material is relatively impervious to the solvent action of oils and gases. The rings 68 and 69 thus sealingly engage their respective surfaces and the member 67 therefore provides an effective seal for the chamber 52 and effectively resists the ingress of foreign abrasive substances to the bearing surfaces and the escape of lubricant from the chamber.

Referring to Figs. 5 and 6, I have shown another modification of my invention generally similar to that illustrated in Fig. 4 but wherein a sheet metal cup is utilized as a guideway for the ball engaging shoes rather than an integral band. The housing generally indicated at 80 is provided with a generally semi-circular end wall 81 and is flared outwardly concentric with the end wall 81 to provide a circular collar 82. A preferably sheet metal cup 83 is secured within the end wall 81 of the housing preferably by press-fitting. The cup 83 is provided with an aperture 85 concentric with the cup walls through which a shank 62 of the ball element is projected. The cup 83 is also slotted as indicated at 86 and 87 to provide communicating channels from the bearing surfaces to a laterally disposed chamber 90 formed in the housing for reasons previously described.

The top wall of the housing 80 is flared outwardly concentric with the end wall 81 thereof to form a collar 91 provided with an external circular groove. A closure element 92 hereinbefore described in connection with Fig. 4 constrictingly engages the collar 91 and the shank 62.

The shank 62 has affixed thereto a ball 57 which engages the inner faces of the shoes 56 previously described in connection with the modification illustrated in Fig. 4 and is thereby constrained to move generally radially of the normal position of ball center.

A collar 82 is formed in the lower face of the housing and acts as a support for the projecting portion of cup 83, the inner wall of this projected portion being recessed to provide a circular shoulder 93 against which is pressed an outwardly dished plate 94 and is sealed therewith by flanging over spaced peripheral portions of the cup edges to form a tongue and groove connection. The modification described requires relatively little machine work and can be quickly and easily assembled to provide a rigid and relatively strong housing which may be effectively sealed against the ingress of foreign abrasive material or the escape of the lubricant if it is desired to utilize the chamber as a lubricant reservoir.

Although I have shown and described the embodiments of my invention, I contemplate that numerous and extensive departures may be made therefrom without departing from the spirit and scope of my invention and the appended claims.

Having thus described my invention, what I claim is:

1. In a housing construction for joints of drag links and the like, said housing comprising a hollow member having spaced side walls and an end wall forming an elongated chamber, a transverse bridge connecting opposite side walls of the chamber and together with portions of the end wall and the side walls enclosing a space adapted to receive a joint bearing element and provided with spaced passageways between the other side walls of the chamber and a portion of the bridge whereby lubricant in the chamber may circulate through one passageway into said bearing space and out of the other passageway back into the chamber.

2. In a housing construction for joints of drag links and the like, said housing comprising a member having spaced side walls and an end wall forming an elongated chamber, the end wall and adjacent portions of the opposite side wall conforming to the wall of an internal generally cylindrical bore, an externally cylindrical hollow element pressed into the bore and providing an annular support enclosed in said chamber and spaced from certain of the side walls of the chamber and adapted to receive and position a joint bearing element, a side wall of the chamber having a perforation therein aligned with the annular support and through which a joint mechanism element may be projected to cooperate with a bearing element in said annular support.

3. In a bearing construction for joints of drag links and the like, a housing comprising a hollow member having spaced side walls and an end wall forming an elongated chamber, the end wall and the adjacent portions of opposite side walls conforming to the wall of an internal generally cylindrical bore, an externally cylindrical hollow element pressed into the bore providing an annular support disposed in the chamber and spaced from certain of the side walls of the chamber and adapted to receive and position the joint bearing element, a side wall of the chamber having a perforation therein aligned with the annular support and through which a joint mechanism element may be projected to cooperate with a bearing element in the annular support, the chamber wall opposite said above-identified perforation having a perforation therein, the hollow element extending outwardly through said perforation, and a closure for the exterior portion of said hollow element.

4. A one-piece cast metal housing for joints of drag links and the like and comprising a hollow member having spaced side walls and end walls forming an elongated lubricant chamber, a longitudinally split tubular portion extending from one end wall, a bridge portion joining opposite lateral walls of the chamber adjacent one end thereof, and forming with the end and side walls a support for a joint bearing element, a chamber wall being provided with a perforation aligned with said support and through which a joint mechanism element may be projected to cooperate with a bearing element in the support, and a passageway between the chamber interior and a bearing element in the support.

5. A one-piece cast metal housing for joints of drag links and the like and comprising a hollow member having spaced side and end walls forming an elongated lubricant chamber, a longitudinally split tubular portion extending from one end wall thereof, a bridge portion joining opposite lateral walls of the chamber adjacent an end wall, and forming with the end and side walls of the chamber a support for a joint bearing element, a chamber wall being provided with a perforation therein aligned with the joint bearing element support and through which a joint mechanism element may be projected to cooperate with a bearing element in the support, and a pair of passageways between the chamber interior and a bearing element in said support.

OSCAR U. ZERK.